United States Patent
Kadar-Kallen et al.

(10) Patent No.: US 7,758,389 B2
(45) Date of Patent: Jul. 20, 2010

(54) CONNECTOR ASSEMBLY HAVING A MOVABLE PLUG

(75) Inventors: Michael Aaron Kadar-Kallen, Harrisburg, PA (US); Edmund J. Haley, Dillsburg, PA (US); Larry Gene Eby, Dover, PA (US)

(73) Assignee: Tyco Electronics Corporation, Middletown, PA (US)

( * ) Notice: Subject to any disclaimer, the term of this patent is extended or adjusted under 35 U.S.C. 154(b) by 8 days.

(21) Appl. No.: 12/020,330

(22) Filed: Jan. 25, 2008

(65) Prior Publication Data

US 2009/0191738 A1 Jul. 30, 2009

(51) Int. Cl.
*H01R 24/00* (2006.01)

(52) U.S. Cl. ...................................... 439/660
(58) Field of Classification Search ................. 439/357, 439/354, 607–610, 660
See application file for complete search history.

(56) References Cited

U.S. PATENT DOCUMENTS

| | | | | |
|---|---|---|---|---|
| 2,508,767 A | * | 5/1950 | Modrey | 439/324 |
| 2,762,025 A | * | 9/1956 | Melcher | 439/580 |
| 4,316,647 A | * | 2/1982 | Bailey et al. | 439/354 |
| 4,337,989 A | * | 7/1982 | Asick et al. | 439/609 |
| 4,361,375 A | * | 11/1982 | Bailey et al. | 439/357 |
| 4,634,208 A | * | 1/1987 | Hall et al. | 439/610 |
| 7,264,402 B2 | * | 9/2007 | Theuerkorn et al. | 385/59 |

* cited by examiner

*Primary Examiner*—Jean F Duverne

(57) ABSTRACT

A connector assembly configured to connect a plug body into a receiving module of an electrical device is provided. The connector assembly has a cable end and a plug end and a cable channel extending therethrough. The connector assembly includes an inner body having and an outer housing that is coupled to and surrounds at least a portion of the inner body. The outer housing is configured to attach to the electrical device. The connector assembly further includes a plug having the plug body and at least one cable conductor extending through the cable channel and connecting to the plug body. The plug body is held near or within the inner body and is movable from a first position near or within the inner body to a second position engaged with the receiving module.

20 Claims, 13 Drawing Sheets

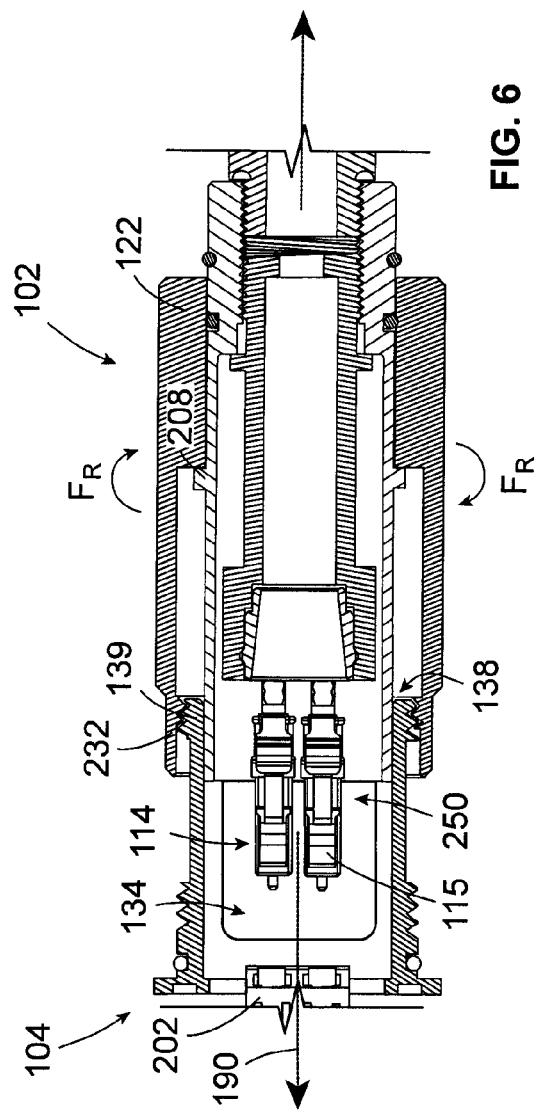
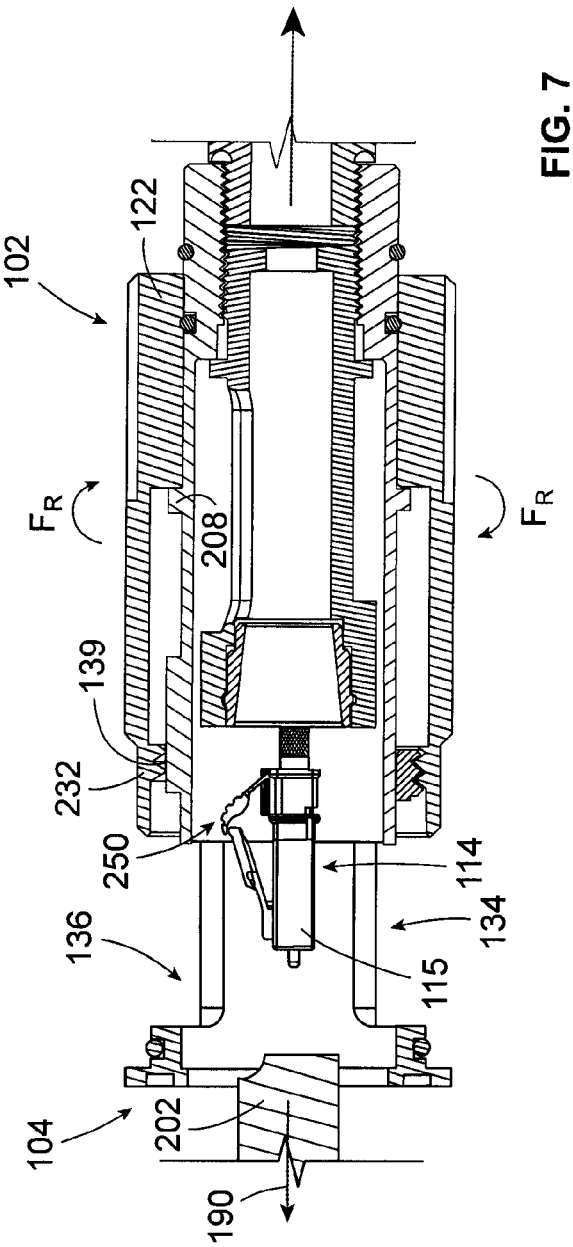

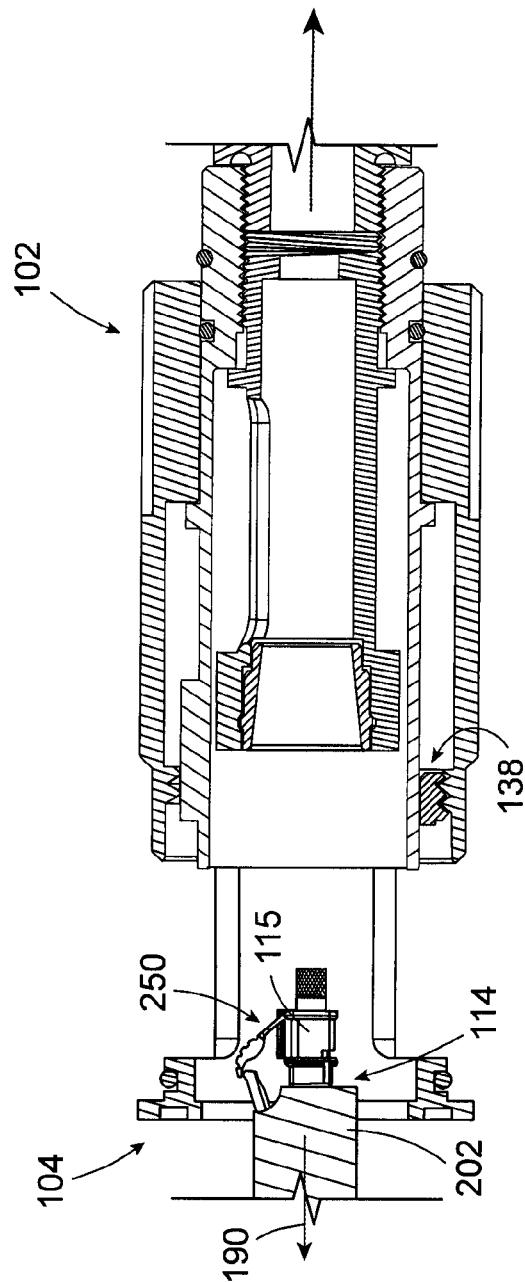
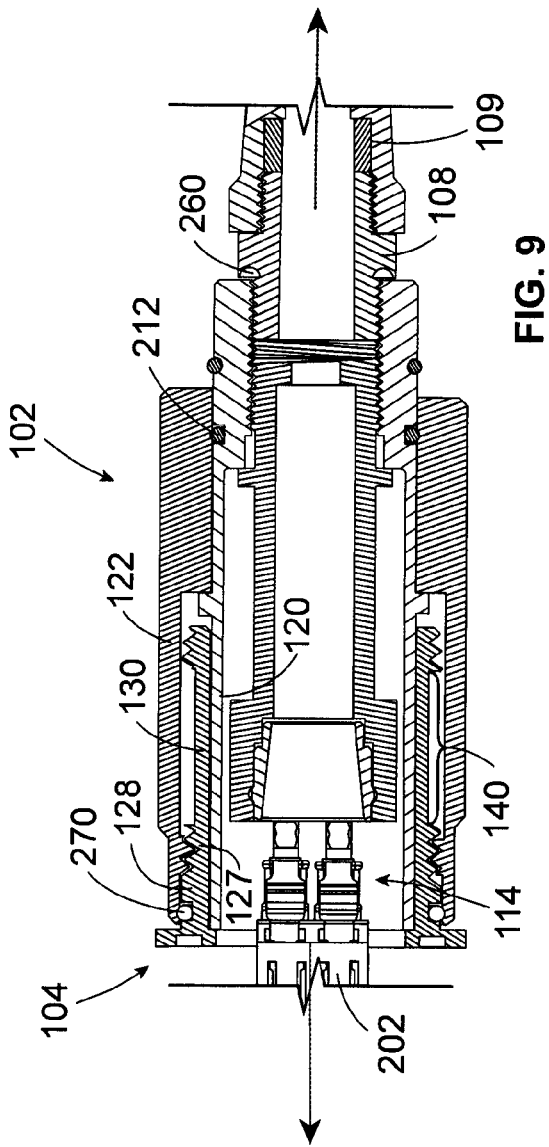
FIG. 8
FIG. 9

CONNECTOR ASSEMBLY HAVING A MOVABLE PLUG

BACKGROUND OF THE INVENTION

The invention relates generally to connector assemblies, and more particularly to connector assemblies that form an environmental seal around an electrical or fiber optic connection.

As electrical and communication devices or systems age, components of the device or system may need to be replaced or serviced. For example, some conventional electrical devices, including optoelectronic devices, use small form-factor pluggable (SFP) transceivers for both telecommunication and data communication applications. In time, the SFP transceiver may need to be replaced or serviced due to poor performance or a change/upgrade in technology. Generally, the SFP transceiver interfaces a circuit board to one or more connectors, such as an LC connector. The standard LC connector has a plug body that includes a coupling mechanism (e.g., a depressible latch) to prevent unintentional removal of the LC connector from the SFP transceiver.

In one conventional connector assembly, an LC connector is inserted into an SFP transceiver of an electrical control box. The connector assembly includes an outer housing that surrounds the connecting SFP transceiver and LC connector. The outer housing screws onto a fitting of the box in order to form a seal around the connection. The coupling mechanism in the conventional connector assembly is a latch that is permanently depressed so that the LC connector may freely be inserted and withdrawn from the SFP transceiver. However, in order to maintain the communicative connection between the SFP transceiver and the LC connector while the latch is depressed, an insertion force must be continuously applied by the connector assembly. Over time, the continuous insertion force may damage the SFP transceiver, the mounting hardware, or other inner circuitry of the control box.

Thus, there is a need in the industry for electrical and/or fiber optic connector assemblies that facilitate connecting and disconnecting a plug body with a receiving module without continuously applying an axial force into the receiving module. Further, there is a need in the industry for connector assemblies that utilize the coupling mechanism on the plug body.

BRIEF DESCRIPTION OF THE INVENTION

In one embodiment, a connector assembly configured to connect a plug body into a receiving module of an electrical device is provided. The connector assembly has a cable end and a plug end and a cable channel extending therethrough. The connector assembly includes an inner body and an outer housing that is coupled to and surrounds at least a portion of the inner body. The outer housing is configured to attach to the electrical device. The connector assembly further includes a plug having the plug body and at least one cable conductor extending through the cable channel and connecting to the plug body. The plug body is held near or within the inner body and is movable from a first position near or within the inner body to a second position engaged with the receiving module.

Optionally, the plug body is detached from the inner body. Furthermore, the outer housing may be rotatable around a central axis extending between the plug end and the cable end.

In one embodiment, a connector assembly configured to connect a plug body to a receiving module of an electrical device is provided. The connector assembly has a plug end and a cable end with a cable channel extending therebetween. The connector assembly includes an inner body that has an outer surface. The connector assembly further includes a plug having the plug body and at least one cable conductor connected to the plug body. The cable conductor is wrapped around at least a portion of the outer surface of the inner body. The plug body is movable from a first position near the plug end to a second position engaged with the receiving module.

Optionally, the body surface is an outer surface of the inner body. Furthermore, when the plug body is in the first position the cable conductor has a gathered condition about the outer surface of the inner body, and when the plug body is in the second position the cable conductor has a tighter condition.

BRIEF DESCRIPTION OF THE DRAWINGS

FIG. 6 is a top-down cross-sectional view of the connector system shown in FIG. 4 when the connector assembly and guideframe initially engage.

FIG. 7 is a side cross-sectional view of the connector system shown in FIG. 6.

FIG. 8 is a side cross-sectional view of the connector system shown in FIGS. 6 and 7 after a plug has been inserted into a receiving module.

FIG. 9 is a top-down cross-sectional view of the connector system shown in FIG. 7.

DETAILED DESCRIPTION OF THE INVENTION

Figure 1:
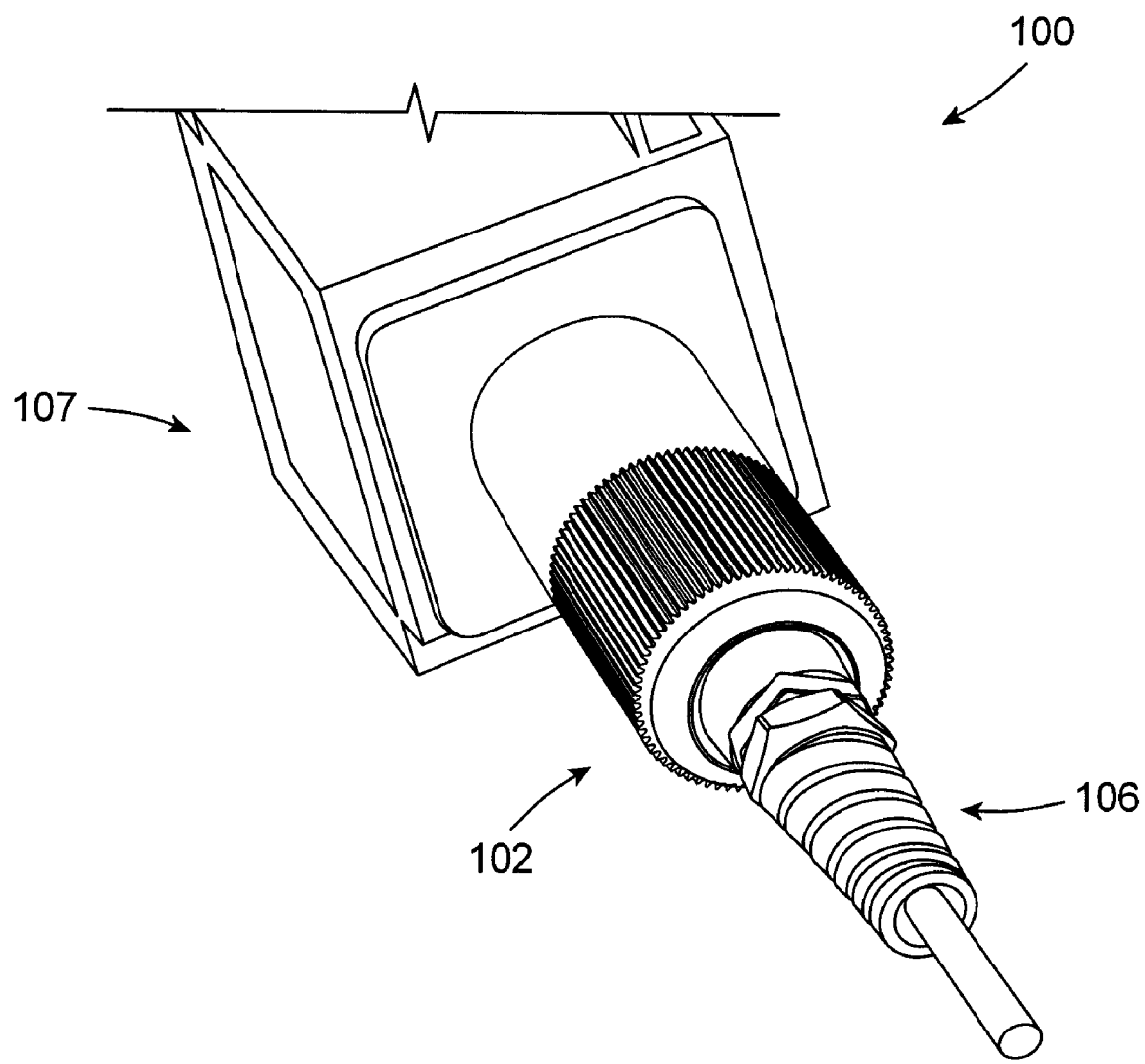
FIG. 1 is a perspective view of a connector system formed in accordance with one embodiment.

FIG. 1 is a perspective view of a connector system 100 formed in accordance with one embodiment. The connector system 100 is used to connect a cable assembly 106 to an electrical device or system 107 and includes a connector assembly 102 and a guideframe 104 (shown in FIG. 3). The electrical device 107 may be, for example, an optoelectronic device or fiber optic adapter or connector. In FIG. 1, the connector assembly 102 is fully mated with the guideframe 104 such that the connector assembly 102 is secured to a wall or surface of the electrical device 107. When fully mated, the connector assembly 102 may form an environmental seal around an electrical and/or fiber optic connection between the electrical device 107 and cable assembly 106. As will be discussed in greater detail below, the connector system 100 facilitates connecting and disconnecting a plug 114 (FIG. 2) to a receiving module 202 (FIG. 4) of the electrical device 107. As one example, the plug 114 may be a duplex LC connector and the receiving module 202 may be a SFP transceiver or fiber optic adapter. However, the connector system 100 is not limited as such and may be used to facilitate connecting and disconnecting other electrical or optical components.

Figure 2:
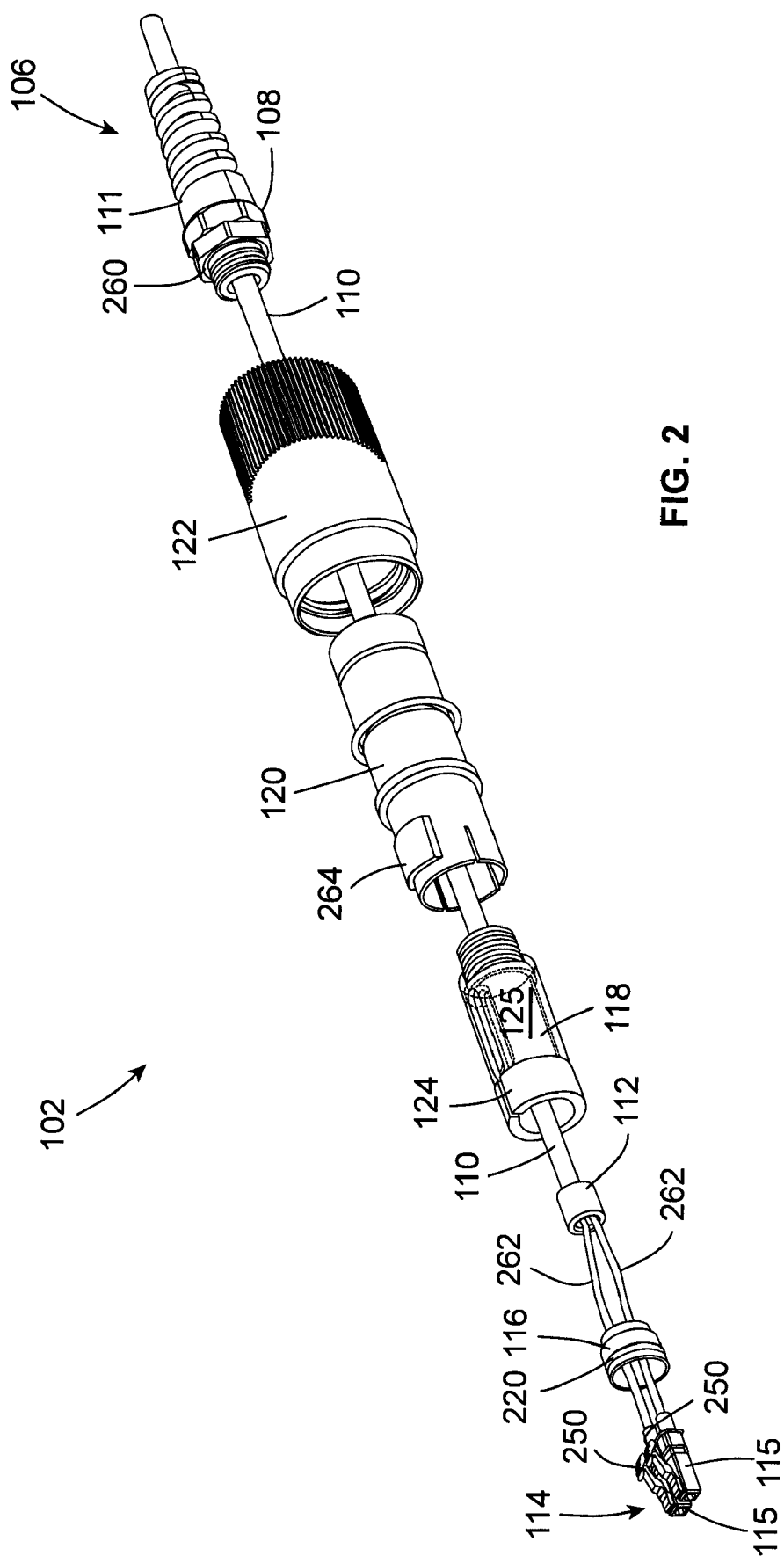
FIG. 2 is an exploded view of a connector assembly that may be used with the system shown in FIG. 1.

FIG. 2 is an exploded view of the connector assembly 102 and illustrates parts and components of the connector assembly 102 before the connector assembly 102 is assembled about the cable assembly 106. The cable assembly 106 includes a cable fitting 108 and a cable jacket 110 that extends through the cable fitting 108 along an axial direction. The cable fitting 108 includes threads and a sealing member 260 at the base of the threads on one side of the cable fitting 108. The cable fitting 108 also includes on the opposite side a cable seal gasket 109 (shown in FIG. 9). The cable seal gasket 109 is compressed, sealing the cable fitting 108 to the cable jacket 110 when the strain relief 111 is rotated counterclockwise with respect to the cable fitting 108. The cable assembly 106 also includes a crimp sleeve 112 located at a terminal end of the cable jacket 110. Cable conductors 262, such as electrical wire or optical fibers, extend outward from the crimp sleeve 112 and join the plug 114. The plug 114 may include one or more plug bodies 115 having a coupling mechanism 250 that is used to removably attach the plug 114 to the receiving module 202 (FIG. 4) when the plug 114 is inserted. The coupling mechanism 250 can be, for example, a flexible latch that may be depressed in order to disengage the plug bodies 115 from the receiving module 202. The coupling mechanism may also include threaded fasteners (e.g., for screwing) such as those found in ferrule connectors (FC), a quarter-twist locking mechanism as those found in straight tip (ST) connectors, a push-pull mechanism such as those found in subscriber or standard connectors (SC), and the like. In FIG. 2, the plug 114 is a pair of Lucent connectors (LC), but other cables and plug assemblies may be used.

The connector assembly 102 includes an insert member 116, an inner body 118, an intermediate housing 120, and an outer housing 122. The insert member 116 may be configured to hold the plug 114 when the plug 114 is not engaged with the receiving module 202 (FIG. 4) and may also include a locking ridge 220 on an outer surface thereof. The inner body 118 includes a body surface 125 that extends along an axial direction and a cap end 124 configured to receive the insert member 116. When constructing the connector assembly 102, the insert member 116 is engaged to the cap end 124 of the inner body 118. The inner body 118 is secured to the intermediate housing 120 such that intermediate housing 120 surrounds at least a portion of the inner body 118. The cable conductors 262 extend through the inner body 118 and insert member 116 to the plug bodies 115. The intermediate housing 120 may include a key member 264 projecting from an outer surface of the intermediate housing 120. The key member 264 maintains the inner body 118 and intermediate housing 120 in alignment so that the cable conductors 262 do not become twisted when the connector assembly 102 is engaged to the guideframe 104 (FIG. 3).

Figure 4:
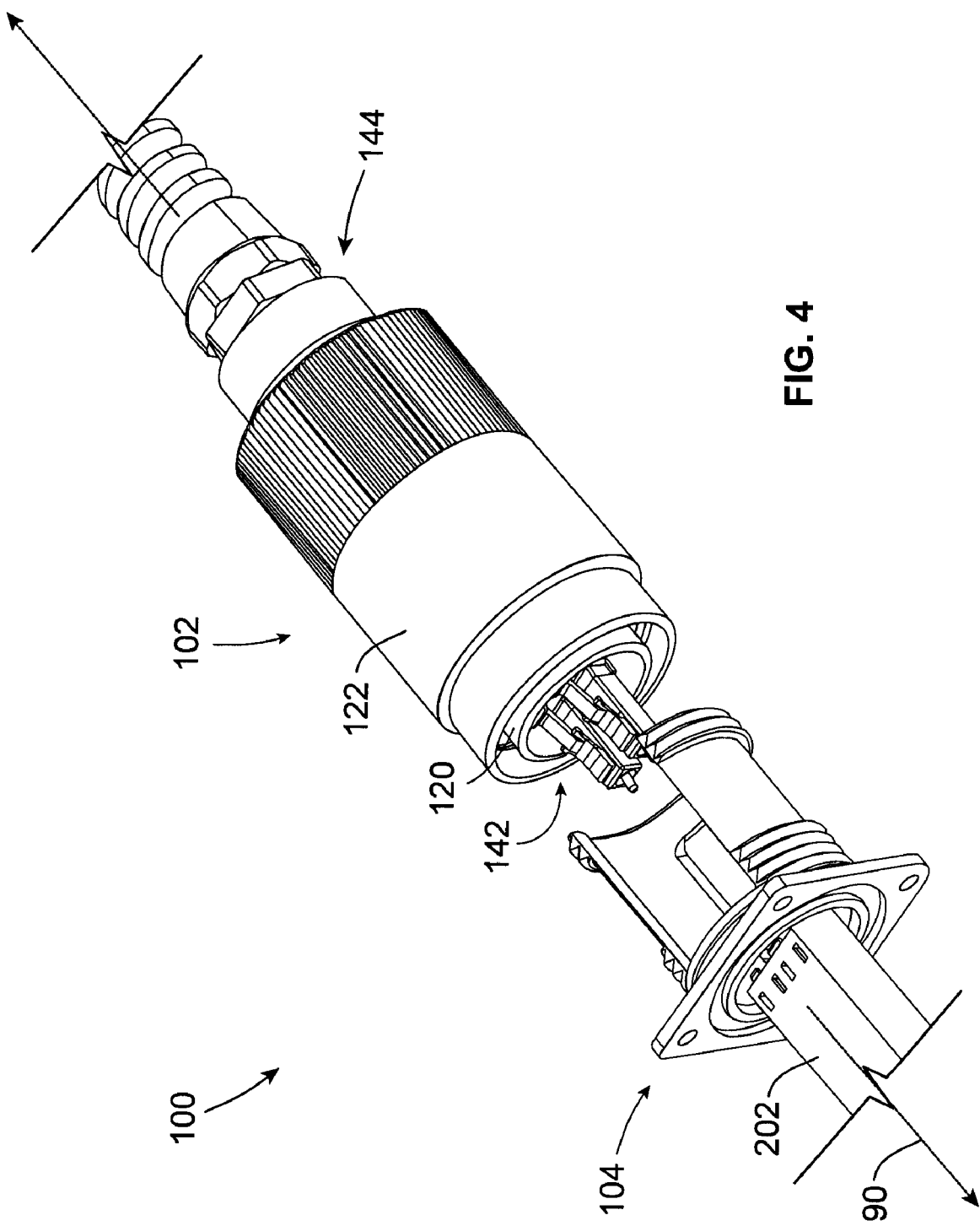
FIG. 4 is a perspective view of the connector assembly shown in FIG. 2 before the connector assembly engages the guideframe.

The outer housing 122 is fitted over the intermediate housing 120 such that the outer housing 122 may slide and/or rotate about an outer surface of the intermediate housing 120. When the connector assembly 102 is fully constructed, the outer housing 122 may be movable with respect to the intermediate housing 120, the inner body 118, and the insert member 116. As will be discussed in greater detail below, the connector assembly 102 may be moved or adjusted into various positions. As such, the connector assembly 102 may facilitate connecting and disconnecting the plug 114 with the receiving module 202 (FIG. 4). Furthermore, when the plug 114 is engaged with the receiving module 202, the connection between the plug 114 and the receiving module 202 is maintained by the coupling mechanism(s) 250 without substantial additional forces directing or forcing the plug 114 into the receiving module 202. As such, the connector assembly 102 may improve the efficiency and lifetime operation of the receiving module 202 or other hardware or circuitry of the electrical device 107 (FIG. 1), unlike other connector assemblies that provide substantial axial force to maintain the connection between the plug and the receiving module.

Figure 3:
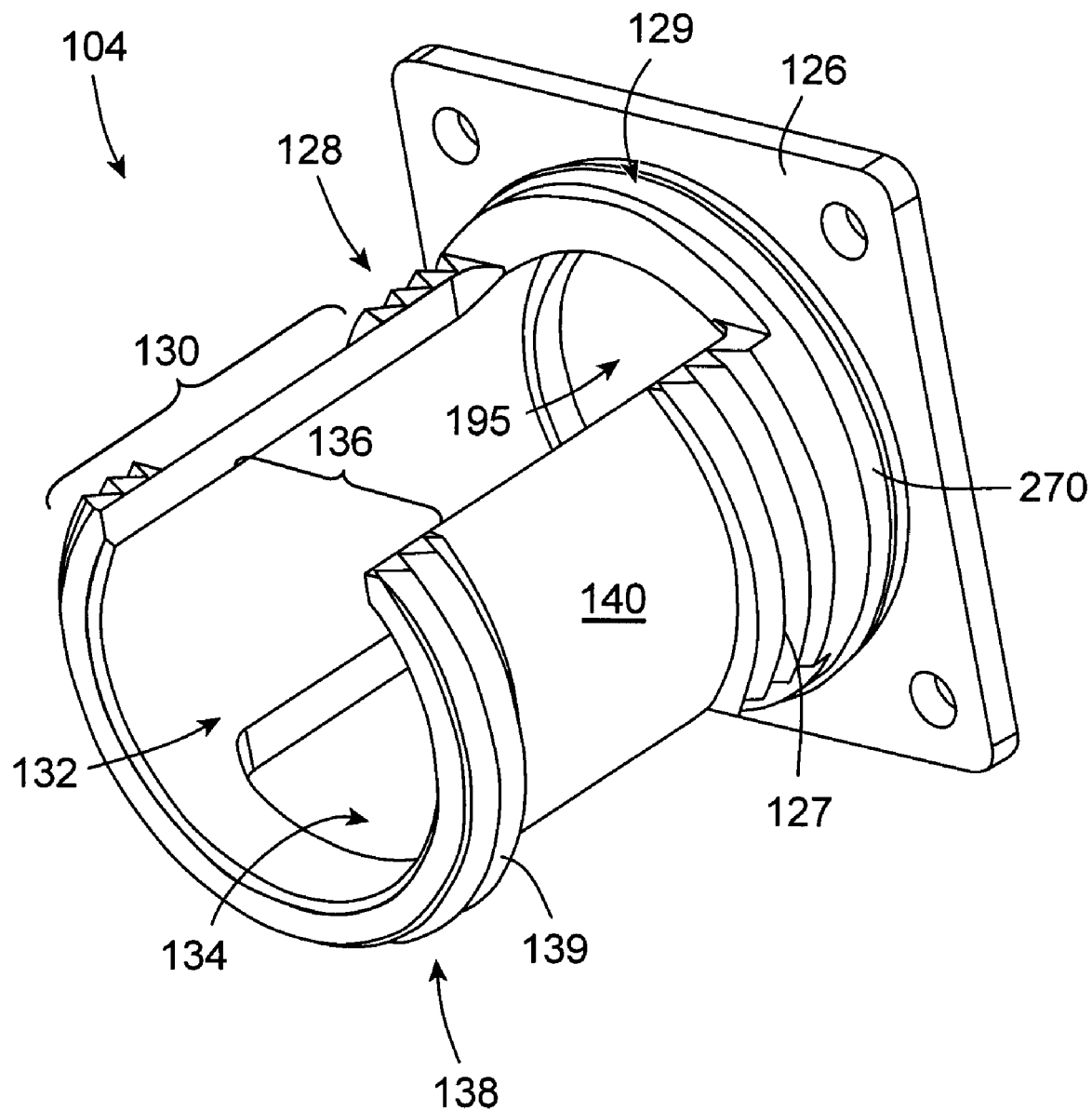
FIG. 3 is an exposed perspective view of a guideframe that may be used with the system shown in FIG. 1.

FIG. 3 is a perspective view of a guideframe 104 that may engage the connector assembly 102 (FIG. 2) to form the connector system 100 (FIG. 1). The guideframe 104 may include a panel 126 having an opening 195 and a base 128 projecting from a surface of the panel 126. The panel 126 may be secured or attached to a wall (not shown) of the electrical device 107 (FIG. 1) such that an aperture (not shown) within the wall is aligned with the opening 195. In an alternative embodiment, the guideframe 104 may be integratively formed with the wall of the electrical device 107. The base 128 may include an annular portion 129 and a fastener element 127 extending from the annular portion 129. The annular portion may hold a sealing member 270. The base 128 may be configured to engage the outer housing 122 (FIG. 2) to form a seal around the plug 114 (FIG. 2) and receiving module 202 (FIG. 4). For example, the base 128 may directly surround the opening 195 (e.g., like a collar). In FIG. 3, the fastener element 127 is one or more threads projecting from a surface of the base 128 so that corresponding threads on the outer housing 122 may engage. However, the fastener element 127 may have other features to facilitate attaching the outer housing 122 to the base 128. For example, a stem wall 130 may include indentations that mate or snap-fit with protrusions of the outer housing 122. As another example, the outer housing 122 may be formed from a flexible material that flexes around and grips a single ridge projecting from the stem wall 130. Other fastening methods, such as using clips, snaps, ties, bolts, screws and the like, may be used to attach the outer housing 122 to the base 128, to the panel 126, or to the electrical device 107.

The guideframe 104 may include the stem wall 130 projecting away from the base 128 and forming a pathway 132 that extends to the opening 195. As will be discussed in greater detail below, the stem wall 130 and the pathway 132 may be shaped to mate with the connector assembly 102 (FIG. 2) when the connector assembly 102 is coupled to the guideframe 104. The stem wall 130 and pathway 132 may also be configured to guide the connector assembly 102 toward the receiving module 202 (FIG. 4) when the inner body 118 (FIG. 2) and the intermediate housing 120 (FIG. 2) are advanced through the guideframe 104. As shown in FIG. 3, the stem wall 130 has cut-outs 134 and 136. The cut-outs 134 and 136 may be configured to allow access to the pathway 132 and/or to provide visibility for a user or technician when the connector assembly 102 is partially engaged with the guideframe 104. The cut-out 134 may extend from the base 128 a predetermined distance toward an edge of the stem wall 130. In one embodiment, the cut-out 136 extends from the base 128 to the edge of the stem wall 130 and is configured to mate with key member 264 (FIG. 2) when the intermediate housing 120 engages the guideframe 104.

Also shown in FIG. 3, an end portion 138 is formed at the distal end of the stem wall 130. The end portion 138 may have a fastener element 139, such as threads or other features like those discussed with reference to fastener element 127. The end portion 138 is configured to provide sufficient support to the connector assembly 102 when the connector assembly 102 initially engages the stem wall 130 or when the connector assembly 102 is withdrawing from the stem wall 130. In FIG. 3, the end portion 138 is arc-shaped, however, other shapes including a full circle and shapes that are not circular may be used. The stem wall 130 also includes an outer surface 140 that separates the fastener elements 139 and 127 by a predetermined distance. As will be discussed in greater detail below, the separate fastener elements 139 and 127 along with the outer surface 140 facilitate guiding and supporting the connector assembly 102 when the connector assembly 102 is mated with the guideframe 104.

Figure 5:
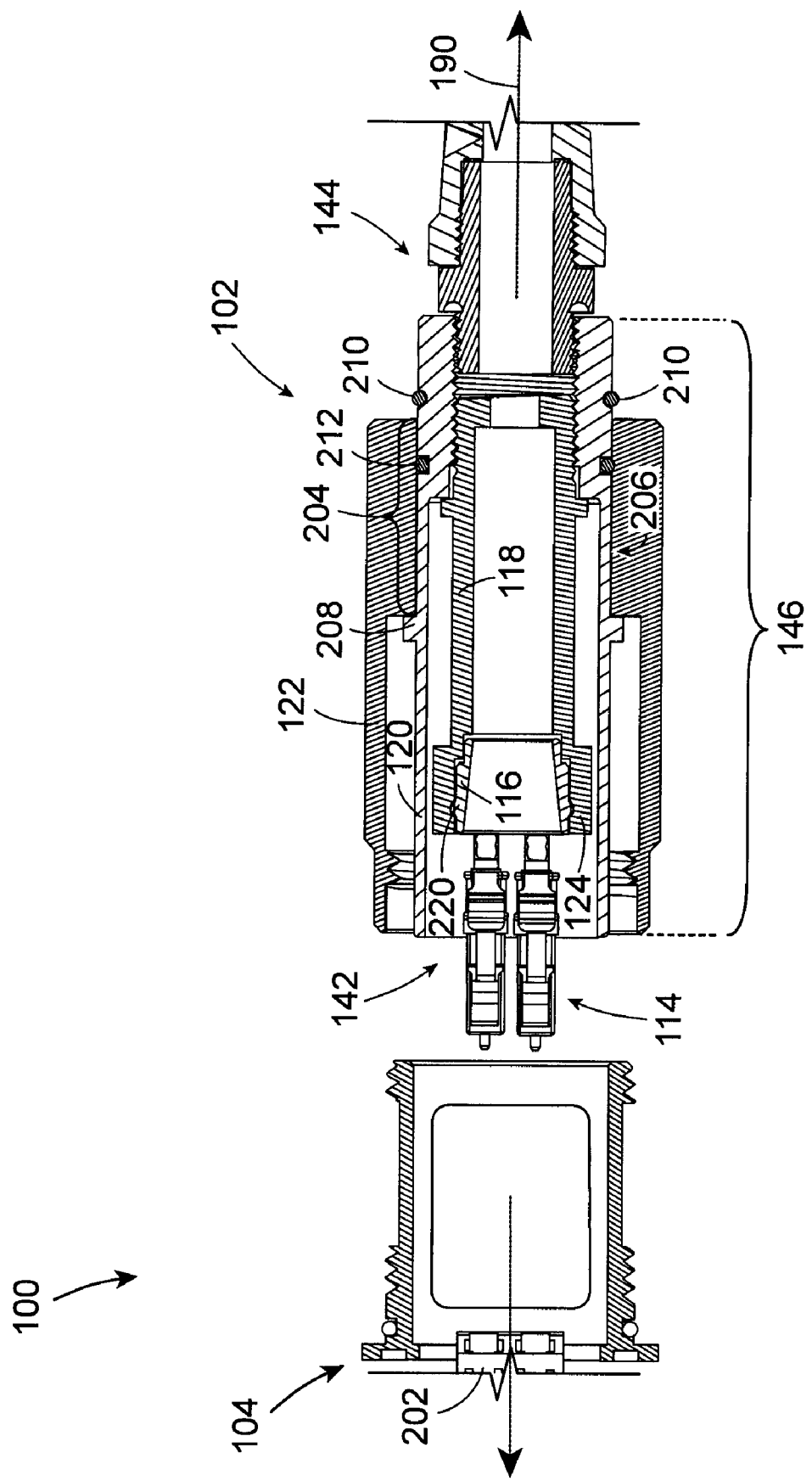
FIG. 5 is a top-down cross-sectional view of the connector assembly and guideframe shown in FIG. 4.

FIGS. 4-9 illustrate steps taken for the connector assembly 102 to engage the guideframe 104. FIGS. 4 and 5 illustrate a perspective view and a cross-sectional view, respectively, of the connector system 100 before the connector assembly 102 engages the guideframe 104. The connector assembly 102 has a plug end 142 and a cable end 144 and a cable channel 146 (FIG. 5) extending therebetween. In FIGS. 4 and 5, the connector system 100 is in an initial unmated position such that the connector assembly 102 and the guideframe 104 are disconnected but aligned along a central axis 190. The outer housing 122 is engaged with and surrounds the intermediate housing 120. As shown in FIG. 5, the outer housing 122 includes a grip portion 204 that may directly engage an outer surface 206 of the intermediate housing 120. In particular, the grip portion 204 may slide in the axial direction and/or rotate about the central axis 190 along the outer surface 206. The outer surface 206 includes a front stop 208. In FIG. 5, the outer housing 122 is in an advanced position with respect to the outer surface 206 such that the grip portion 204 abuts the front stop 208. The intermediate housing 120 may include a sealing member 212 that causes a frictional force against the outer housing 122 to reduce the likelihood of the outer housing 122 unintentionally sliding or rotating against the outer surface 206. Also shown, the intermediate housing 120 may include a rear stop 210 to prevent the outer housing 122 from sliding off of the intermediate housing 120.

Also shown in FIG. 5, the insert member 116 may be inserted into the cap end 124 of the inner body 118 proximate to the plug end 142. The cap end 124 of the inner body 118 may include a channel or furrow on an inner surface that is configured to engage the locking ridge 220 so that the insert member 116 is removably attached within the cap end 124. The insert member 116 may facilitate holding the plug 114 and/or cable conductors 262 at least partially within the insert member 116 and/or the plug end 142 of the connector assembly 102. In an alternative embodiment, the inner body is formed to include the dimensions of the insert member 116 such that the cap end 124 is formed as such.

As used herein, the term "hold" or "holding" includes the plug 114 and/or cable conductors being removably coupled to the inner body 118 and/or insert member 116, but also includes the plug 114 and/or cable conductors 262 freely resting against the inner surface of the insert member 116 and/or intermediate housing 120. In one embodiment, the plug 114 and the cable conductors 262 are detached from the inner body 118 and the insert member 116. As used herein, the term "detached" includes being physically separated or touching a surface, but not coupled or fixed thereto. In one embodiment, the plug end 142 of the connector assembly 102 includes a latch or hook (not shown) that may hold the plug 114 when the plug 114 is unengaged. As shown in FIG. 5, the inner surface of the insert member 116 may be slightly inclined such that the cable conductors 262 (e.g., when the cable conductors are optical fibers) do not sharply bend. Furthermore, the inner surface of the insert member 116 may be configured to allow the cable conductors 262 and/or the plug bodies 115 to rest against the inner surface when the connector assembly 102 is unengaged.

FIGS. 6 and 7 are a top-down cross-sectional view and a side cross-sectional view, respectively, of the connector assembly 102 as the connector assembly 102 engages the guideframe 104. (For illustrative purposes, the cable conductors 262 have been removed from FIGS. 6-9.) When inserting the connector assembly 102 to or removing the connector assembly 102 from the guideframe 104, the connector assembly 102, the guideframe 104, and the receiving module 202 are aligned with respect to each other along the central axis 190. To engage the guideframe 104 and the connector assembly 102, the connector assembly 102 is advanced toward the guideframe 104 in an axial direction such that the plug 114 enters the pathway 132 (FIG. 3). The outer housing 122 may include a fastener element 232 that is configured to engage the fastener element 139 of the guideframe 104. As shown, the fastener elements 139 and 232 are complementary threads, however other mechanisms may be used for attaching the connector assembly 102 to the guideframe 104 as discussed above. When the fastener element 232 and 139 are initially engaged, a rotational force FR in a clockwise direction may be applied to secure the fastener elements 232 and 139. While the outer housing 122 is rotated about the central axis 190, the grip portion 204 may be pressed against the front stop 208.

Once the fastener elements 232 and 139 have been connected such that the connector assembly 102 is fully supported by the guideframe 104, a user of the connector assembly 102 may use a tool or fingers (not shown) to move and insert the plug 114 into the receiving module 202. More specifically, when the connector assembly 102 is engaged and supported by the fastener element 139 of the guideframe 104, the plug 114 and corresponding coupling mechanism 250 are exposed. The tool or fingers may access the pathway 132 (FIG. 3) through cut-outs 134 and 136 (FIG. 7) and grab or pinch the plug 114 and insert the plug 114 into the receiving module 202. As discussed above, plug 114 is coupled to the cable conductors 262. In one embodiment, the plug 114 may only be coupled to the cable conductors 262 (FIG. 5) such that the plug 114 would be freely movable except for the limitations of the coupled cable conductors 262.

FIG. 8 is a side cross-sectional view of the connector assembly 102 when the connector assembly 102 is supported by the end portion 138 (FIG. 3) and the plug 114 has been inserted into the receiving module 202. When the plug bodies 115 initially enter corresponding cavities (not shown) of the receiving module 202, the coupling mechanisms 250 of the plug bodies 115 then depress thereby allowing the plug bodies 115 to be fully inserted into the corresponding cavity of the receiving module 202. As the plug bodies 115 are inserted, the coupling mechanisms 250 snap into the engaged position (FIG. 8). Furthermore, when engaged, the plug 114 is fully supported by the coupling mechanism 250 engaged with the receiving module 202. As such, the connector assembly 102 may improve the efficiency and lifetime operation of the receiving module 202 or other hardware or circuitry of the electrical device 107 (FIG. 1), unlike other connector assemblies that require substantial axial force to maintain the connection between the plug and the receiving module. Furthermore, because the plug 114 is independently directed and inserted by the tool and/or user, the connector assembly 102 may tolerate different positions of the receiving module 202. More specifically, the connector assembly 102 may tolerate linear and angular misalignments of the receiving module 202.

FIG. 9 illustrates a top-down cross-sectional view of the connector system 100 when the connector assembly 102 and the guideframe 104 are fully engaged. After the plug 114 has been inserted into the receiving module 202, the connector assembly 102 continues to move axially toward the guideframe 104. The stem wall 130 slides between the outer housing 122 and the intermediate housing 120 thereby guiding the connector assembly 102 toward the base 128. After the fastener elements 127 and 232 are fully engaged, the connector assembly 102 and the guideframe are fully mated as shown in FIG. 9. Also shown, when the connector assembly 102 is fully engaged to the guideframe 104, the sealing members 260, 212, and 270 may cooperate with the outer housing 122 and the intermediate housing 120 to form an environmental seal that protects the connection from the surrounding environment. More specifically, the sealing member 270 may facilitate sealing a gap between the guideframe 104 and the outer housing 122, the sealing member 212 may facilitate sealing a gap between the intermediate housing 120 and the outer housing 122, and the sealing member 260 may facilitate sealing a gap between the intermediate housing 120 and the cable fitting 108. In addition, the cable seal gasket 109 facilitates sealing a gap between the cable fitting 108 and the cable jacket 110 (FIG. 2).

To disengage the fastener elements 127 and 232, the outer housing is rotated in a counter-clockwise direction. The outer housing 122 is then pulled by a retracting force along the outer surface 140 of the stem wall 130 until the connector assembly 102 and the guideframe 104 engage at the end portion 138 as shown in FIG. 8. The plug 114 may be removed from the receiving module 202 by triggering the coupling mechanism 250 (FIG. 8) to release the plug 114. After the coupling mechanism 250 has been triggered and released from the receiving module 202, the outer housing 122 may be further rotated to fully disengage the connector assembly 102 from the guideframe 104.

As discussed above, the plug 114 is coupled to the cable conductors 262 and is movable from a retracted position near the plug end 142 to an extended position inserted into the receiving module 202. In one embodiment, the cable conductors 262 are relaxed and bend along or near the inner surfaces of the inner body 118 when in the retracted position. For example, the cable conductor 262 may be slightly twisted or formed to have a slightly helical structure. When the cable conductors 262 are optical fibers, in the retracted position, the helical structure coils or gathers such that the bending may still transmit communication along the optical fibers. When the plug 114 is moved and inserted into the extended position, the cable conductors 262 straighten and become tighter. Alternatively, the inner body 118, intermediate housing 120, and outer housing 122 are slidable along the cable jacket 110 from a removed position that exposes the plug 114 to a closed position in which the inner body 118, intermediate housing 120, and outer housing 122 cover the plug 114 and engage the base 128 of the guideframe 104.

Figure 10:
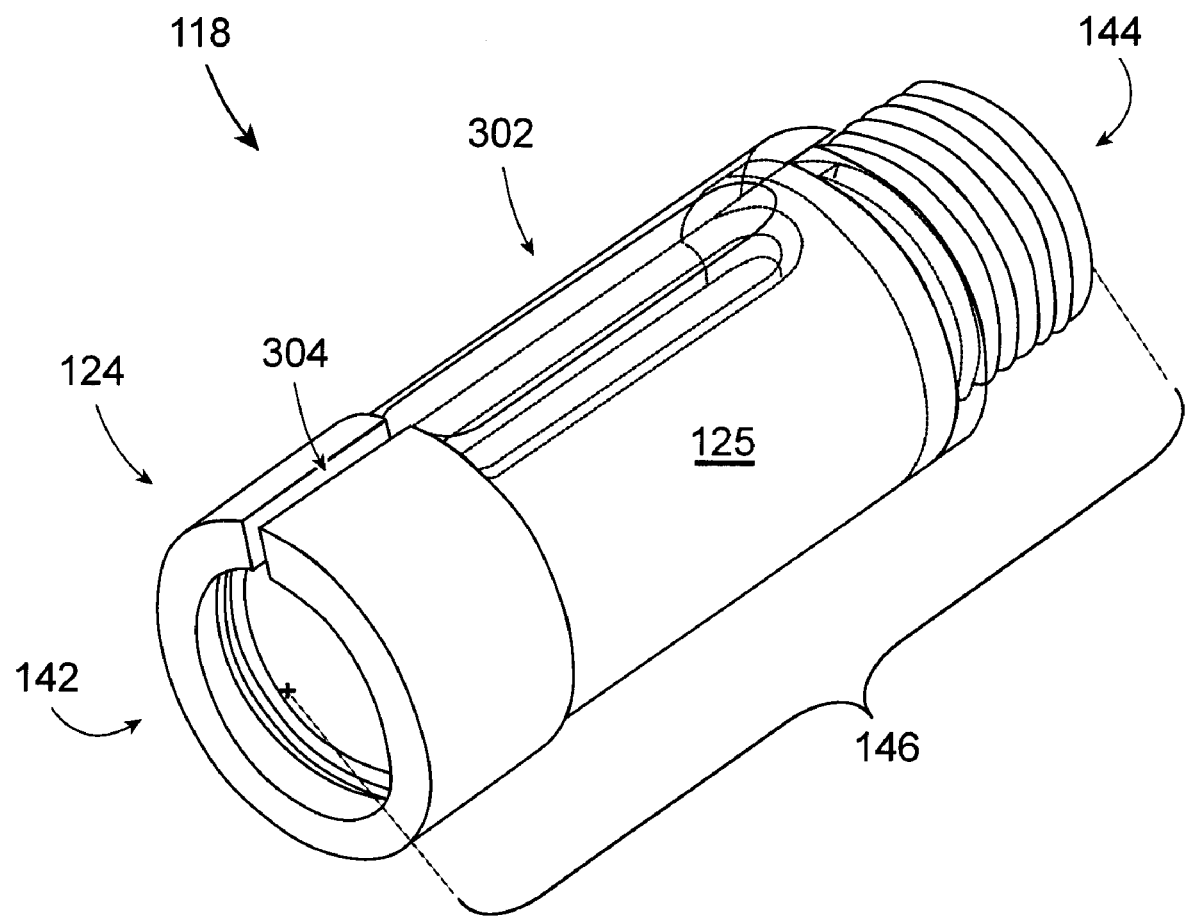
FIG. 10 is a perspective view of the inner body that may be used with the connector assembly shown in FIG. 2.

FIG. 10 is an isolated perspective view of the inner body 118. The inner body 118 includes a slot 302 that extends axially along the body surface 125 and parallel to the cable channel 146. The slot 302 extends from a cap end 124 to a rear end of the inner body II 8 proximate to the cable assembly 106 (FIG. 2). The slot 302 provides access for the cable conductor(s) 262 (shown in FIGS. 11 and 12) to move in and out of the cable channel 146. As shown, the slot 302 includes a cap slit 304 that stretches throughout the cap end 124. As will be discussed in further detail below, the inner body 118 is configured to have cable conductors 262 wrapped about the outer body surface 125.

Figure 11:
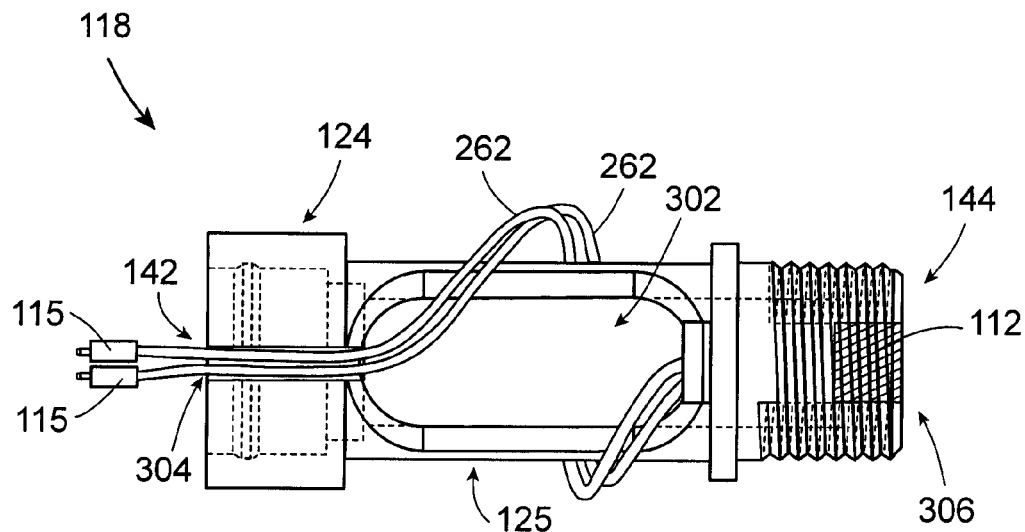
FIG. 11 is a plan view of the inner body when the cable conductors are wrapped in a gathered condition.
Figure 12:
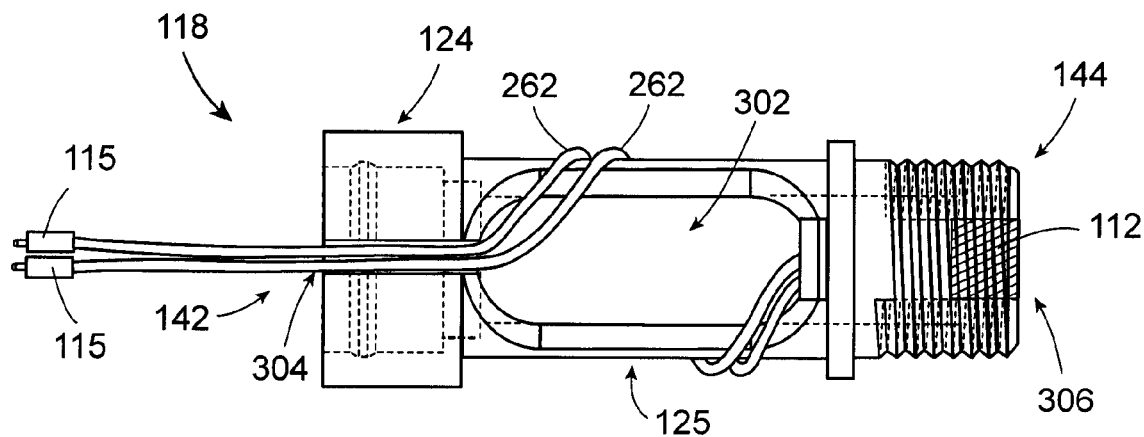
FIG. 12 is a plan view of the inner body when the cable conductors are wrapped in a tighter condition.

FIGS. 11 and 12 are plan views of the inner body 118 when the cable conductors 262 are in a gathered condition and a stretched or tighter condition, respectively. When the plug body 115 is proximate the plug end 142, the cable conductors 262 as shown in FIG. 11 are wrapped around the body surface 125 in a gathered condition (i.e., loosely surrounding and possibly contacting the body surface 125). When the plug body 115 is moved an axial distance toward and inserted into the receiving module 202 (FIG. 4), the cable conductors 262 as shown in FIG. 12 stretch tightly against the body surface 125 of the inner body 118. When the outer housing 122 fully engages the guideframe 104 as shown in FIG. 9, the optical fibers 262 then return to the gathered condition as shown in FIG. 11. If the cable conductors 262 are optical fibers, returning to the gathered condition may decrease any transmission loss that may have occurred in the tighter condition.

As shown in FIGS. 11 and 12, in one embodiment, the cable conductors 262 extend from a fixed end 306 at the crimp sleeve 112 through the cable channel 146 (FIG. 10). To construct the gathering mechanism, the inner body 118 may be slid over the cable jacket 110 (FIG. 2) until the crimp sleeve 112 is secured in the cable end 144 of the inner body 118 and the cable conductors 262 extend through and out of the cable channel 146. The cable conductors 262 may be brought out of the cable channel 146 by sliding the cable conductors 262 through the cap slit 304. The cable conductors 262 are then directed out of the cable channel 146 through the slot 302 and wrapped along the body surface 125. More specifically, the cable conductors 262 are helically wrapped with substantially one revolution along the body surface 125. In an alternative embodiment, the cable conductors 262 may be wrapped more than one revolution or only a section of the body surface 125. The cable conductors 262 are then directed through the cap slit 304 such that a portion of the cable conductors 262 near the plug end 142 are extending through the cable channel 146. An insert member, such as insert member 116 shown in FIG. 2, may then be slid over the plug bodies 115, along the cable conductors 262, and inserted into the cap end 124. The insert member 116 is configured to prevent the cable conductors 262 from sliding through the cap slit 304. When fully constructed, the cable conductors 262 extend from the fixed end 306, around a portion of the body surface 125, and out of the cable channel 146. The cable conductors 262 may have a predetermined length. When the plug body 115 is moved back and forth along the axial direction, the cable conductors 262 move back and forth from a gathered condition to a tighter condition. Although FIG. 12 illustrates the cable conductors tightly pressed against the body surface 125, to be in the tighter condition, the cable conductors 262 must only be more tightly wound than the gathered condition.

In an alternative embodiment, the inner body 118 does not include the slot 302. The cable conductors 262 may then extend completely through the inner body 118 and be configured to coil or gather when the plug body 115 is moved to the retracted position such that the cable conductors 262 press against and bend with the inner surfaces of the inner body 118. In another alternative embodiment, the cable conductors 262 only surround the body surface 125 (FIG. 10) of the inner body 118 and do not extend in and out of the slot 302. When the plug body 115 is moved to the retracted position, the cable conductors 262 may press against and bend with the inner surfaces of the intermediate housing 120.

Figure 13:
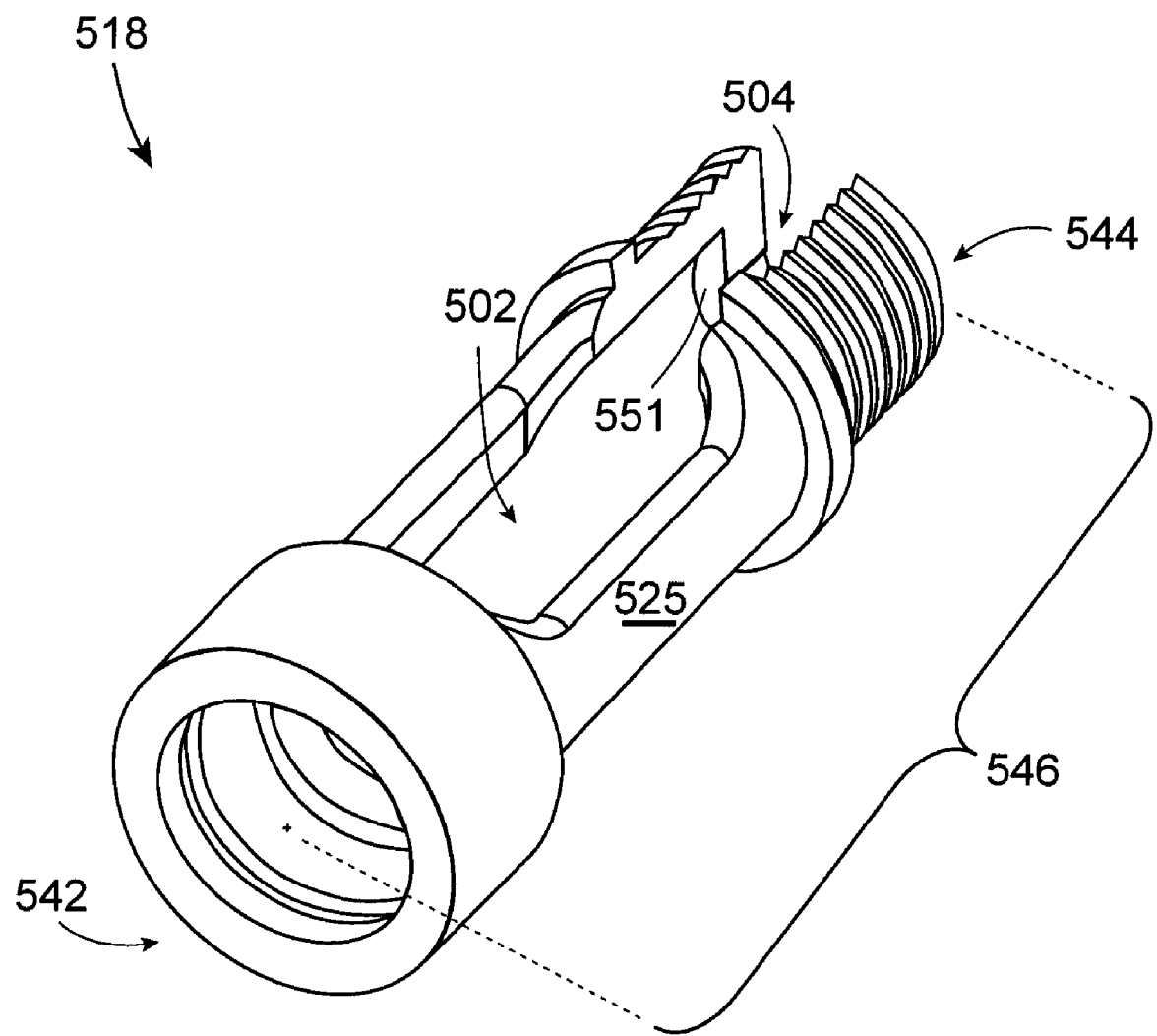
FIG. 13 is a perspective view of an inner body that is formed in accordance with another embodiment.

FIG. 13 illustrates a perspective view of an inner body 518 that is formed in accordance with another embodiment. The inner body 518 has an outer surface 525 and includes a front end 542, a rear end 544, and a cable channel 546 extending therebetween. The inner body 518 has a similar structure as the inner body 118 (FIG. 10), however, the inner body 518 does not have a cap slit 304 (FIG. 10), but includes a rear slit 504 that extends from a slot 502. The rear slit 504 is configured to allow the cable jacket 110 (FIG. 2) to be lowered through the rear slit 504 and the crimp sleeve 112 (FIG. 2) to be lowered through the slot 502. The cable jacket 110 may then be pulled toward the rear end 544 of the inner body 518. The inner body 518 may include one or more rear stops 551 so that the cable jacket 110 and crimp sleeve 112 may not be pulled through the cable channel 546. The cable conductors (FIG. 2) may then be similarly wrapped about the inner body 518 and outer surface 525 as discussed above with reference to the inner body 118. Although an insert member, such as the insert member 116, may be used, the inner body 518 does not require an insert member to keep the cable conductors in place.

Figure 14:
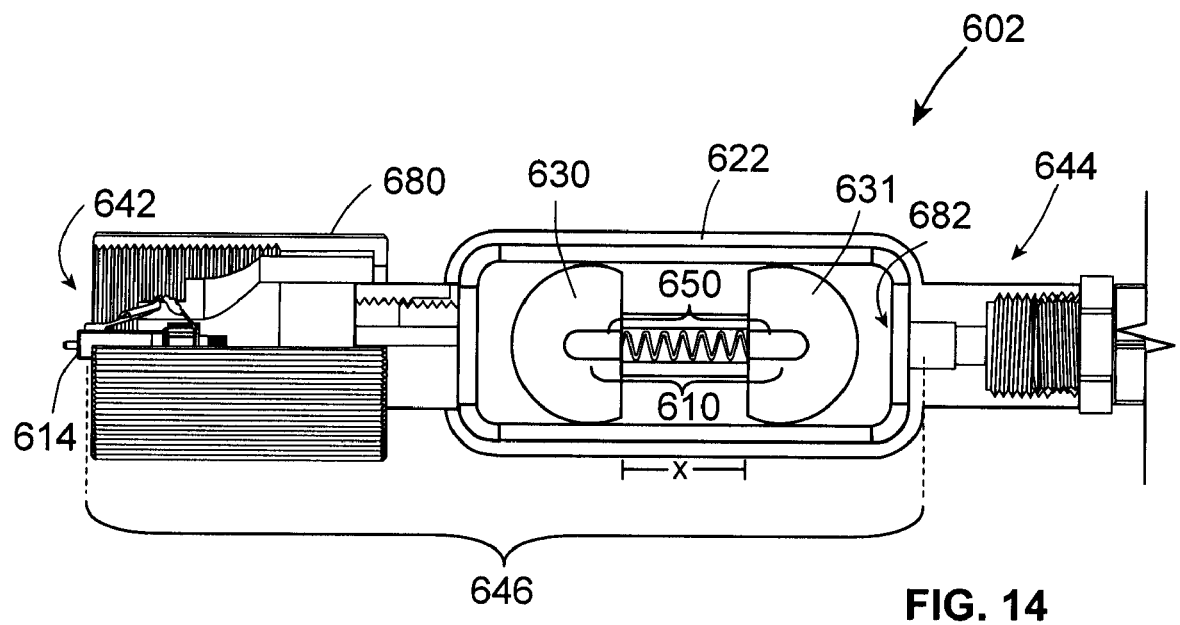
FIG. 14 is a cross-sectional view of a connector assembly that is formed in accordance with another embodiment.
Figure 15:
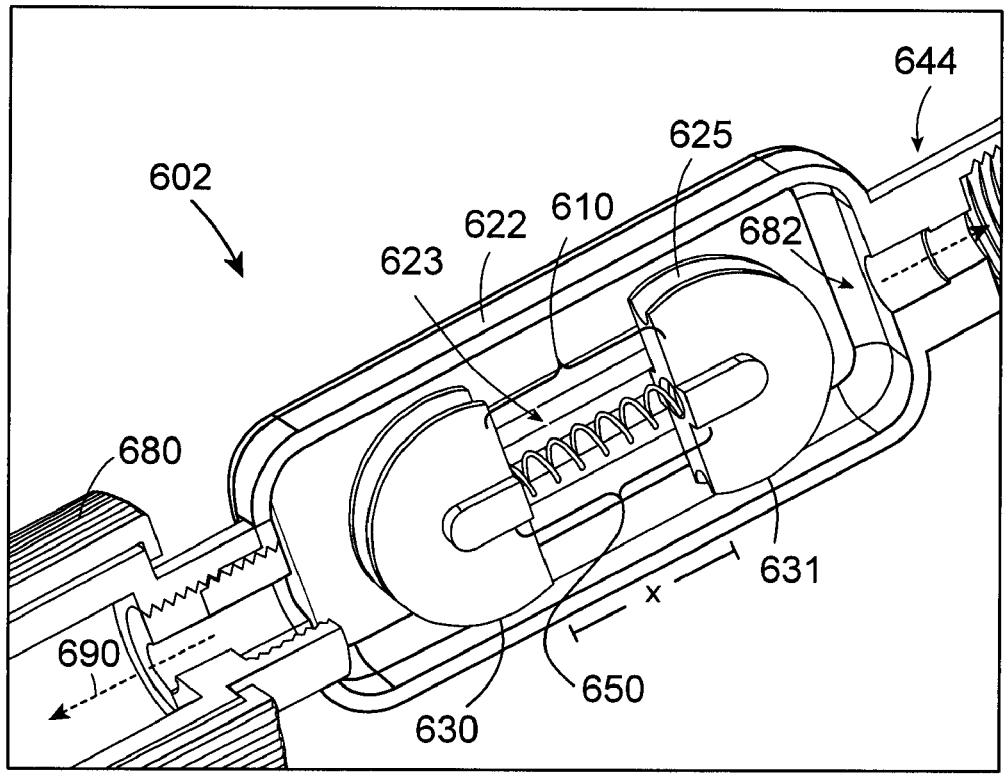
FIG. 15 is an exposed cross-sectional view of the connector assembly shown in FIG. 14.

FIGS. 14 and 15 illustrate a cross-sectional view and an exposed perspective view, respectively, of a connector assembly 602 formed in accordance with another embodiment. The connector assembly 602 has a plug end 642 (FIG. 14), a cable end 644, and a cable channel 646 (FIG. 14) extending therebetween. The connector assembly 602 includes an outer housing 622, an inner body 610 surrounded by the outer housing 622, and a connecting member 680 engaged to the outer housing 622 near the plug end 642. The cable conductors (not shown) extend from a fixed end 682 through the cable channel 646 to a plug 614. The inner body 610 includes a body surface 625 (FIG. 15) that may be curved or grooved to hold the cable conductors. In FIGS. 14 and 15, the inner body 610 includes a pair of body units 630, 631 that are separated a predetermined distance X and connected by a collapsing mechanism 650 (shown as a spring in FIGS. 14 and 15). The cable conductors may wrap about the inner body 610. More specifically, the cable conductors may be wrapped about the body surface 625 substantially forming an oval shape formed along a plane that contains a central axis 690 (FIG. 15). When the plug 114 is moved from a retracted position to an extended position, a pulling force (not shown) causes the body units 630 and 631 to collapse toward each other along an inner surface 623 of the outer housing 622. In one embodiment, the body units 630 and 631 are slidably coupled to the inner surface 623, which is configured to maintain the body units 630 and 631 along a predetermined path. When the body units 630 and 631 collapse, the length of the path made by the cable conductors reduces thereby allowing the plug 114 to be withdrawn from the connector assembly 602. When the plug 114 is allowed to return to the retracted position, the collapsing mechanism 650 (e.g., spring) separates the body units 630 and 631 by the predetermined distance X.

Figure 16:
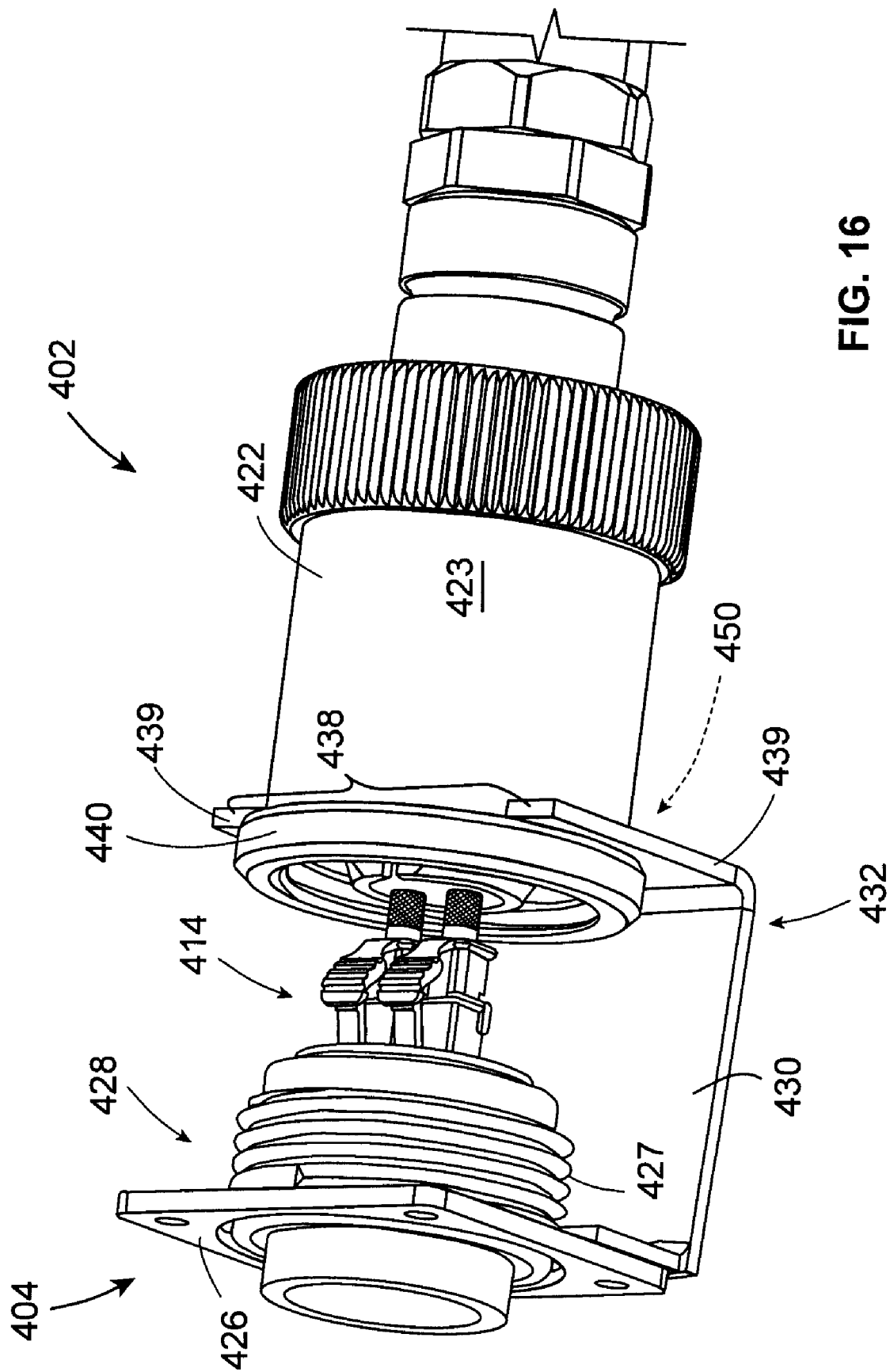
FIG. 16 is a perspective view of a guideframe and connector assembly that may be formed in accordance with another embodiment.

FIG. 16 is a perspective view of a guideframe 404 that may be formed in accordance with one embodiment. Similar to the guideframe 104 (FIG. 3), the guideframe 404 is used to secure a connector assembly 402 to an electrical device, such as electrical device 107 (FIG. 1). The connector assembly 402 may include similar parts and features as the connector assembly 102 described above. The guideframe 404 may include a panel 426 having an opening (not shown) and a base 428 projecting from a surface of the panel 426. The panel 426 may be secured or attached to a wall (not shown) of the electrical device 107 such that an aperture (not shown) within the wall is aligned with the opening. In an alternative embodiment, the guideframe 404 may be integratively formed with the wall of the electrical device 107. The base 428 may include a fastener element 427 extending from the base 428, which may be configured to engage an outer housing 422 of the connector assembly 402 to form a seal around a plug 414 and a receiving module, such as the receiving module 202 (FIG. 4). In FIG. 16, the fastener element 427 is one or more threads projecting from a surface of the base 428 so that corresponding threads on the outer housing 422 may engage. However, the fastener element 427 may have other means of fastening the guideframe 404 to the connector assembly 402 such as those discussed above.

The guideframe 404 may include a stem wall 430 projecting away from the panel 426 and/or the base 428. In one embodiment, the stem wall 430 initially projects radially away from the base 428, turns, and then projects axially outward from the base 428. The stem wall 430 may be secured to the panel 426 or integrally formed therewith. The stem wall 430 may also include an end portion 432 that is positioned a predetermined distance away from the base 428. The end portion 432 may have a fastener element 438, which are illustrated as a pair of fingers 439. The fingers 439 form a slot opening 450 therebetween that is configured to receive the outer housing 422. An outer surface 423 of the outer housing 422 may be pressed against the fingers 439 causing the fingers 439 to flex outward and receive the outer housing 422 within the slot opening 450. The fingers 439 loosely grip the outer surface 423 and allow the connector assembly 402 to be held or rest within the slot opening 450 while an operator is working with the electrical device 107. A rim 440 projects outwardly from the outer surface 423 and may prevent the connector assembly 402 from sliding or being pulled axially away from the guideframe 404. The predetermined distance between the fastener element 438 and the base 428 allows space for a finger or tool to engage the plug 414 (if necessary). Furthermore, the slot opening 450 may facilitate guiding the connector assembly 402 when engaging the guideframe 404.

Figure 17:
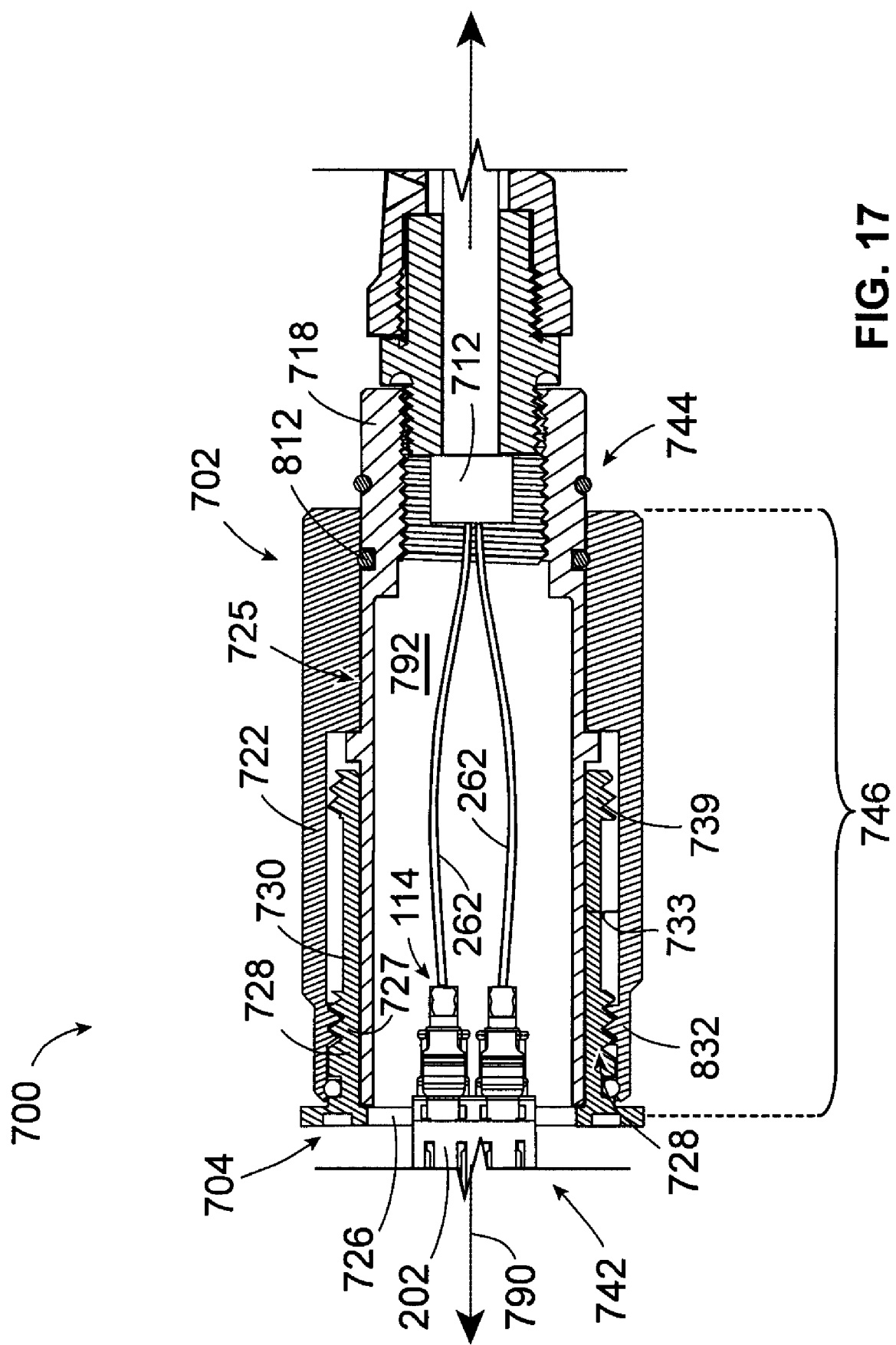
FIG. 17 is a cross-sectional view of a connector system that is formed in accordance with another embodiment.

FIG. 17 is a cross-sectional view of a connector system 700 formed in accordance with another embodiment. The connector system 700 includes a connector assembly 702 and a guideframe 704 that operate and are structured similarly to the connector assembly 102 and the guideframe 104, respectively, shown in FIGS. 4-9. In FIG. 17, the connector assembly 702 and the guideframe 704 are in a fully engaged position. The guideframe 704 is configured to attach or be integratively formed with a wall or surface of an electrical device, such as the electrical device 107 (FIG. 1). The guideframe 704 includes a panel 726 and a base 728 extending outward from the panel 726. The guideframe 704 may also include a stem wall 730 extending outward from the base 728. The stem wall 730 may include a pair of fastener elements 727 and 739, where the fastener element 727 is positioned proximate to the base 728 and the fastener element 739 is positioned on the stem wall 730 a predetermined distance away from the fastener element 727. Similar to the guideframe 104, the guideframe 704 is configured to engage and guide the connector assembly 702 toward the base 728 where the connector assembly 702 may removably attach to the guideframe 704.

The connector assembly 702 has a plug end 742, a cable end 744, and a cable channel 746 extending therebetween along a central axis 790. The connector assembly 702 includes an inner body 718 and an outer housing 722 that surrounds and directly couples to at least a portion of the inner body 718. The inner body 718 may include a sealing member 812 that causes a frictional force against the outer housing 722 to reduce the likelihood of the outer housing 722 unintentionally sliding or rotating against an outer surface 725 of the inner body 718. In one embodiment, the outer housing 722 and the inner body 718 have cylindrical shapes and are substantially concentric. A gap 733 may be defined between the walls of the outer housing 722 and the inner body 718. The gap 733 is configured to receive the stem wall 730 when the connector assembly 702 engages the guideframe 704. Also shown, the outer housing 722 includes a fastener element 832 positioned near the plug end 742.

The inner body 718 and the cable conductors 262 are configured to hold the plug 114 proximate to the plug end 742 within a chamber or cavity 792 defined by the inner surfaces of the inner body 718. The cable conductors 262 extend from a crimp sleeve 712 to the plug 114, which is freely movable and may be extended axially away from the crimp sleeve 712 a predetermined length of the cable conductors 262. In FIG. 17, the plug 114 is engaged with a receiving module, such as the receiving module 202. When constructing the connector system 700, the connector assembly 702 initially engages the fastener elements 739 of the guideframe 704. The cable conductors 262 are in a gathered condition and may be extended axially toward and engage with the receiving module 202. When the plug 114 engages the receiving module 702, the cable conductors 262 are in a tighter condition. The connector assembly 702 may then be advanced toward the base 728 and engage the fastener element 727 thereby returning the cable conductors 262 to the gathered condition. In one embodiment, the guideframe 704 slides within the gap 733 between the outer housing 722 and the inner body 718. When the connector assembly 702 is fully engaged with the guideframe 704 as shown in FIG. 17, the connector system 700 forms an environmental seal similar to the one formed by the connector system 100 shown in FIG. 9. In one embodiment, when the cable conductors 262 are optical fibers, the gathered condition of the optical fibers in FIG. 17 allows for transmission of the optical communication without significant loss. More specifically, the bend radius of the optical fibers while in the gathered condition allows for optical communication without significant loss.

It is to be understood that the above description is intended to be illustrative, and not restrictive. As such, the above-described embodiments (and/or aspects thereof) may be used in combination with each other. In addition, many modifications may be made to adapt a particular situation or material to the teachings of the invention without departing from its scope. For example, the inner body 118 (FIG. 2) and the intermediate housing 120 (FIG. 2) may be integratively formed. Furthermore, the guideframe 104 (FIG. 3) may have only one fastening element or more than two fastening elements.

Dimensions, types of materials, orientations of the various components, and the number and positions of the various components described herein are intended to define parameters of certain embodiments, and are by no means limiting and are merely exemplary embodiments. For example, although the inner body 118, intermediate housing 120, and outer housing 122 have cylindrical shapes, other shapes may be used. Furthermore, the outer housing 122 may directly couple to the inner body 118 if the intermediate housing 120 is not used.

Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means — plus-function format and are not intended to be interpreted based on 35 U.S.C. §112, sixth paragraph, unless and until such claim limitations expressly use the phrase "means for" followed by a statement of function void of further structure.

What is claimed is:

1. A connector assembly configured and operatively assembled to connect a plug body to a receiving module of an electrical device, the connector assembly having a cable end and a plug end and a cable channel extending therethrough, the connector assembly comprising:
   an inner body;
   an outer housing coupled to and surrounding at least a portion of the inner body; and
   a plug including the plug body coupled to at least one cable conductor extending through the cable channel and connecting to the plug body, wherein the plug body is movable with respect to the inner body from a first position near or within the inner body to a second position engaged with the receiving module, wherein the at least one cable conductor moves within the cable channel between first and second conditions when the plug body is moved from the first position to the second position, respectively.

2. The connector assembly in accordance with claim 1 wherein the plug body is detached from the inner body.

3. The connector assembly in accordance with claim 1 wherein the outer housing is rotatable around a central axis extending between the plug end and the cable end while the plug body is connected to the receiving module.

4. The connector assembly in accordance with claim 1 wherein the outer housing is movable with respect to the plug body in an axial direction between the plug and cable ends while the plug body is connected to the receiving module.

5. The connector assembly in accordance with claim 1 wherein the connector assembly further comprises an intermediate housing directly coupled to and surrounding the inner body, the outer housing coupled to and surrounding the intermediate housing.

6. The connector assembly in accordance with claim 1 wherein the cable conductor has a channel portion within the cable channel, the channel portion having a predetermined length that extends from a fixed end to the plug body, the channel portion of the cable conductor moving within the cable channel when the plug body is moved between the first and second positions.

7. The connector assembly in accordance with claim 1 wherein the inner body includes an outer body surface, the cable conductor extending along the outer body surface between the outer body surface and the outer housing.

8. The connector assembly in accordance with claim 1 wherein the plug body is freely movable when held in the first position such that the plug body is capable of being moved to the second position by a hand or tool of a user.

9. The connector assembly in accordance with claim 1 wherein the plug further comprises a coupling mechanism configured to removably attach the plug to the receiving module, the coupling mechanism maintaining a connection between the plug and the receiving module without a substantial axial force into the receiving module.

10. The connector assembly in accordance with claim 1 wherein a central axis extends between the cable and plug ends, the plug body being movable an axial distance in a direction along the central axis when moved between the first and second positions.

11. The connector assembly in accordance with claim 1 wherein the plug body is located a first distance from the cable end in the first position and located a second distance from the cable end in the second position, the second distance being greater than the first distance.

12. The connector assembly in accordance with claim 1 wherein the first condition is a gathered condition in which the cable conductor has at least one bend within the cable channel, and the second condition is a tighter condition in which the at least one bend is straighter within the cable channel relative to the at least one bend in the gathered condition.

13. A connector assembly configured to connect a plug body to a receiving module of an electrical device, the connector assembly having a cable end and a plug end and a cable channel extending therethrough, the connector assembly comprising:

an inner body having a body surface;

a plug including the plug body and at least one cable conductor connected to the plug body, the cable conductor being wrapped about at least a portion of the body surface of the inner body, wherein the plug body is movable from a first position near the plug end to a second position engaged with the receiving module.

14. The connector assembly in accordance with claim 13 wherein the body surface is an outer surface of the inner body.

15. The connector assembly in accordance with claim 13 wherein the cable conductor has a gathered condition when the plug body is in the first position and a tighter condition relative to the gathered condition when the plug body is in the second position.

16. The connector assembly in accordance with claim 13 further comprising a central axis extending between the plug end and the cable end and an outer housing surrounding at least a portion of the inner body, the outer housing being slidable in an axial direction along the central axis with respect to the inner body and configured to engage the electrical device.

17. The connector assembly in accordance with claim 16 wherein the outer housing is rotatable around a central axis extending between the plug end and the cable end.

18. The connector assembly in accordance with claim 13 wherein the inner body includes the cable channel extending therethrough, the inner body including a slot and the cable conductor extending through the slot and into the cable channel.

19. The connector assembly in accordance with claim 13 wherein the cable conductor extends from a fixed end to the plug body.

20. The connector assembly in accordance with claim 13 wherein the at least one cable conductor is wrapped about a central axis that extends between the cable and plug ends.

* * * * *